C. E. LOVEJOY.
BEARING FOR SLIDE RODS FOR TEXTILE MACHINERY.
APPLICATION FILED JULY 5, 1906.
1,118,029.
Patented Nov. 24, 1914.
2 SHEETS—SHEET 2.
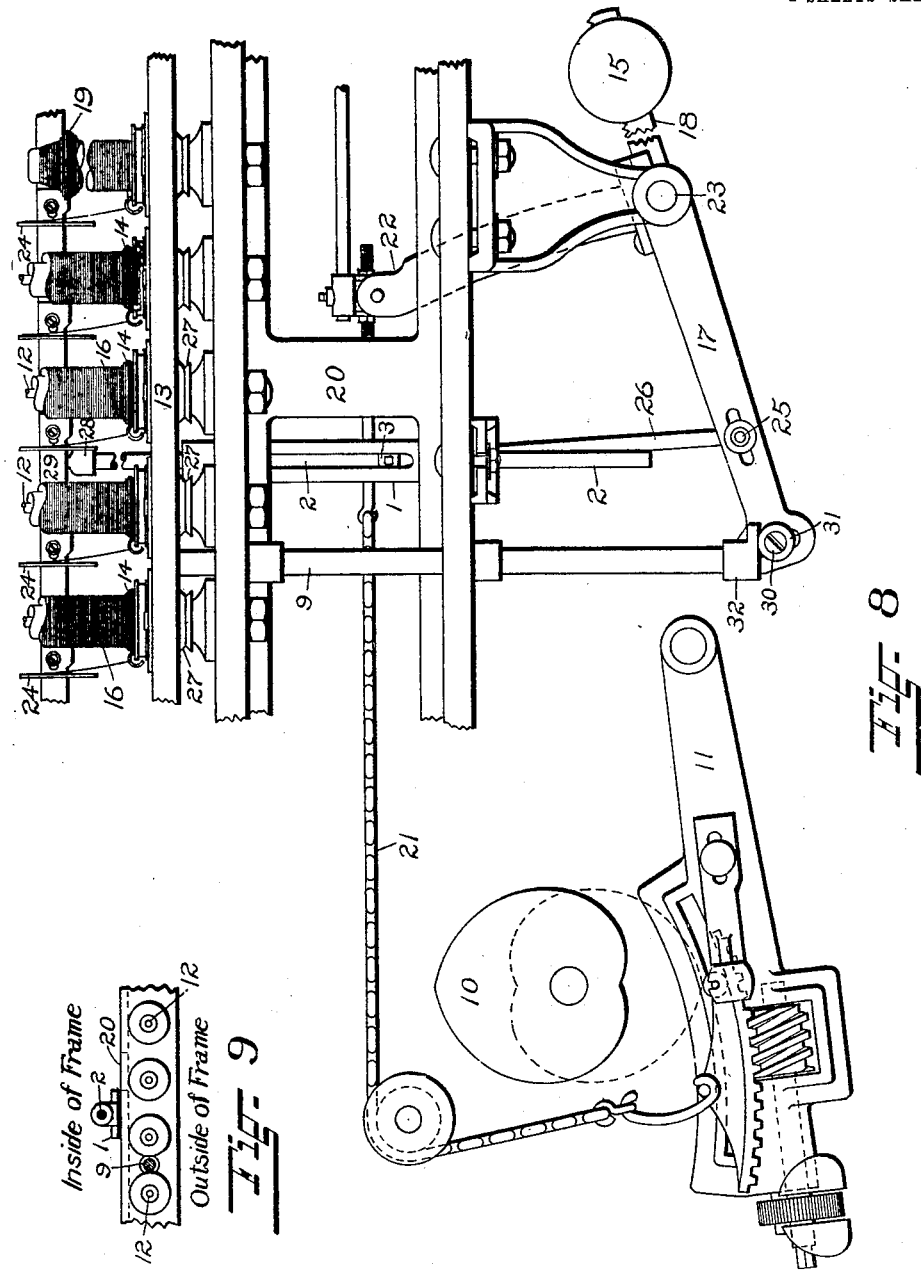
WITNESSES
Channing Whitaker
Irving D. Kimball
INVENTOR
Charles E. Lovejoy

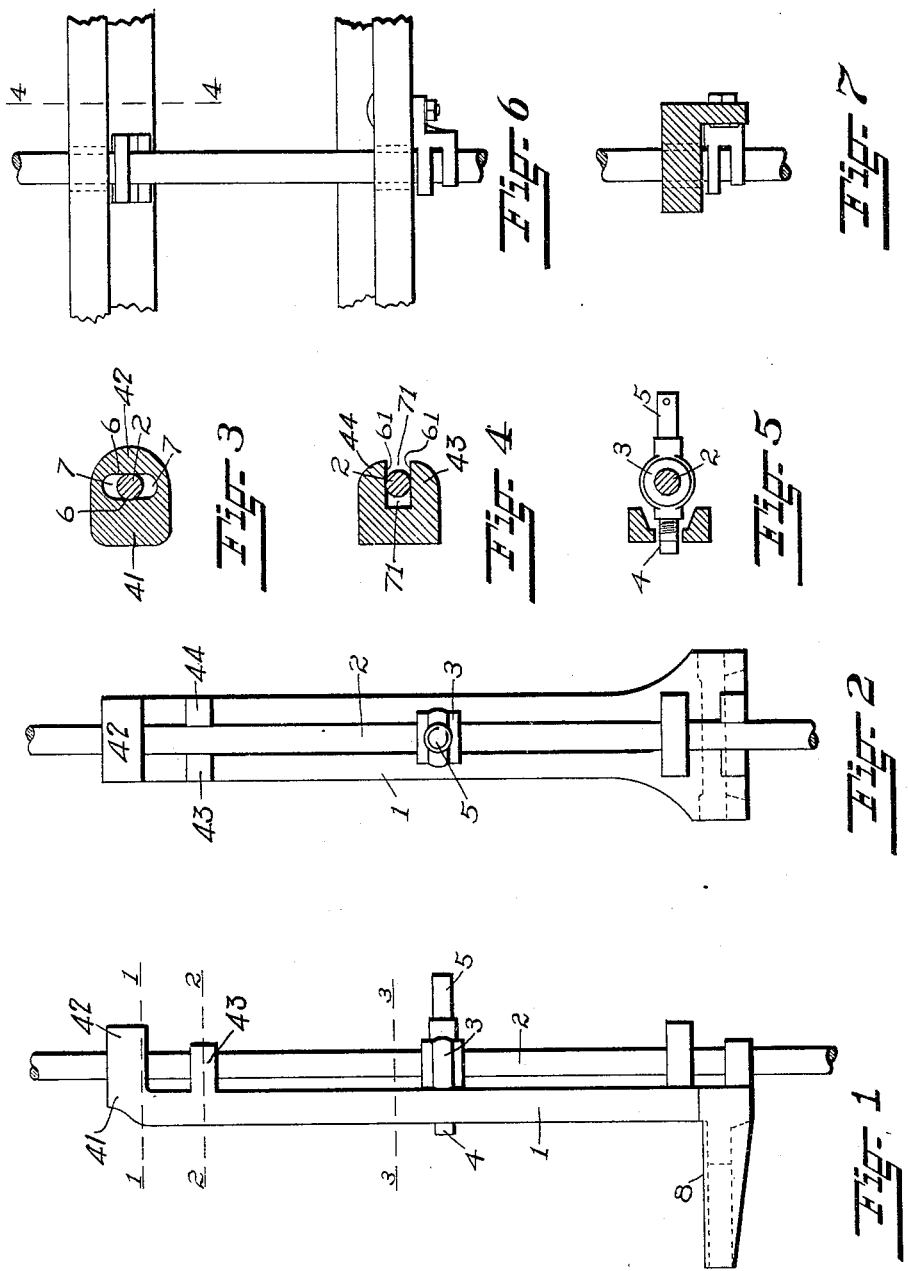

UNITED STATES PATENT OFFICE.

CHARLES E. LOVEJOY, OF LOWELL, MASSACHUSETTS, ASSIGNOR TO SACO-LOWELL SHOPS, OF BOSTON, MASSACHUSETTS, A CORPORATION OF MASSACHUSETTS.

BEARING FOR SLIDE-RODS FOR TEXTILE MACHINERY.

1,118,029.      Specification of Letters Patent.      Patented Nov. 24, 1914.

Application filed July 5, 1906. Serial No. 324,784.

*To all whom it may concern:*

Be it known that I, CHARLES E. LOVEJOY, of Lowell, in the county of Middlesex and State of Massachusetts, have invented certain new and useful Improvements in Bearings for Slide-Rods for Textile Machinery, of which the following description, with the accompanying drawings, is a specification.

Like letters on the drawings denote like parts.

My invention relates to textile machines for location in an atmosphere containing fibrous flyings, and to the combination therein of a rod and a lateral bearing adapted for relative longitudinal traverse of the rod and the bearing and to that class of such combinations in which the bearing is provided with means for preventing such fibrous materials as may collect upon the rod from packing between the rod and the bearing and causing excessive friction in the bearing or the sticking of the rod therein.

The invention consists essentially in such a lateral bearing having parts for contact with the rod, which parts taken together control the relative movement of the bearing and the rod in every direction lateral to the rod, each part having a rod-engaging portion that terminates in an open space which surrounds the portion and separates the part from the other parts, one or more of such parts having a rod-cleaning edge in angular relation with the rod at an intersection of a surface of the part with the rod-engaging portion.

The bearing may be fixed and the rod movable or the rod may be fixed and the bearing movable relatively to the frame of the machine.

The rods of some textile machines are continually enveloped in an atmosphere containing fibrous flyings. Whether the rod slides in stationary bearings or is stationary having sliding bearings, the flying fibers light upon the rods. If the rods are not kept free from fibers they pack fibers into their bearings and eventually stick. Oiled rods gather fibers quicker and stick sooner than others. In ring-spinning-frames the lifter-rods can be cleaned by hand without difficulty and frequently, but the separator-rods cannot. If the builder-motion is of a common type, the sticking of the separator-rod stops the ring-rail and yarn-bunches form on the bobbins, causing waste of yarn and service. The whole duty of some operatives is to stop ring-spinning frames, clean the separator-rods and their partially packed bearings by hand, and to start the frames again. The preferred form of my invention is adapted to the bearings of such separator-rods and includes a power-operated cleaner that effectually prevents the sticking of the rod in its bearing and obviates the necessity for stopping the machine for hand-cleaning.

In the drawings: Figure 1 is an elevation seen when looking lengthwise of a ring-spinning frame of bearings of the preferred form of my invention applied to a separator-stand of a ring-spinning frame. Fig. 2 is an elevation of the same parts seen when looking from the interior of and crosswise of the frame. Fig. 3 is a cross-section of the bearing and rod at line 1—1 of Fig. 1. Fig. 4 is a cross-section of the bearing and rod at line 2—2 of Fig. 1. Fig. 5 is a horizontal-section at line 3—3 of Fig. 1. Fig. 6 is a front elevation of a portion of a ring-spinning-frame with bearings of my invention applied to a lifter-rod. Fig. 7 is a cross-section at the line 4—4 of Fig. 6. Fig. 8 is a diagrammatic view of parts of a ring-spinning-frame that are old in the art. Fig. 9 is a plan showing the usual locations of a separator-rod and of a lifter-rod relatively to other parts of a ring-spinning frame.

The preferred form of my invention is represented in Figs. 1, 2, 3, and 4 in the two bearings for a separator-rod and in Figs. 6 and 7 in the two bearings for a lifter-rod. It will suffice to describe the upper bearing of the separator-rod only. This bearing has four parts arranged in two pairs. The parts 41 and 42 shown in Figs. 1, 2, and 3 make one pair. The parts 43 and 44 shown in Figs. 1, 2, and 4 make the other pair. The four parts are all integral with the stand 1 and located near to one another with the pair 41 and 42 at a slight distance in the direction of the rod from the pair 43 and 44. Each part has a vertical plane surface for engagement or contact with the rod. The parallel lines 6 and 6 seen in Fig. 3 extend lengthwise of the spinning-frame. They are horizontal sections of such vertical plane surfaces of the parts 41 and 42. The parts 41 and 42 control the relative lateral movement of the bearing and the rod in opposite directions crosswise of the spinning-frame. The parallel lines 61 and 61 seen in Fig. 4 extend crosswise of the spinning-frame. They are horizontal sections of such vertical plane surfaces of the parts 43 and 44. The parts 43 and 44 control the relative lateral movement of the bearing and the rod in opposite directions lengthwise of the spinning-frame. Taken together, the four parts 41, 42, 43, and 44 are shaped and located to control the relative movement of the bearing and the rod in every direction lateral to the rod. Each of the four parts 41, 42, 43, and 44 has two horizontal end surfaces. Each such horizontal end surface intersects the said vertical plane surface of the same part in a right-angled edge which is perpendicular to the rod. Each such edge is efficient as a rod-cleaning or rod-scraping edge. Each such part has a rod engaging or touching portion that terminates in and is entirely surrounded by an open space in which the part does not touch the rod, in which fibers may move freely, and which completely separates the rod engaging or touching portion of the part from the rod engaging or touching portion of every other such part. Horizontal sections of such spaces are seen in Fig. 3 at 7 and 7, and in Fig. 4 at 71 and 71. When a rod-cleaning edge completely dislodges a fiber from the rod, it may escape from the bearing and rod through such a space. When a rod-scraping edge partially dislodges a fiber from the rod, the fiber may project into the space and during the continued relative motion of the rod and the bearing in the direction of the rod the fiber may be struck by some part of the bearing and wholly dislodged from the rod. When a fiber is caught between the rod and a rod engaging or touching portion of a part of the bearing, the relative motion of the rod and the bearing in the direction of the rod may roll the fiber, detaching it wholly or partially from the rod. It facilitates the cleaning of the rod to give to the part of the fiber which is free from pressure during the rolling freedom of motion in the space which entirely surrounds the rod engaging or touching portion.

My invention, as applied to the bearings for the nonrotating separator-rods of a ring-spinning-frame in an atmosphere loaded with fibrous flyings, has been long continued in operation under observation with the result that no separator rod has been seen to stick in one of my bearings notwithstanding that, during the period of observation, neither the rod nor the bearing nor the power-operated cleaner of the bearing was cleaned by hand. It is thought that, prior to my invention, there has been no instance of a non-rotating slide-rod surrounded by an atmosphere charged with fibrous flyings and located in a textile machine, which has not required the occasional cleaning by hand of the rod or of its bearings or of some mechanical cleaner connected therewith.

It is not essential to my invention: that the number of parts for engaging or touching the rod shall be four or that any such part shall be integral with the bearing or fastened to a stationary support or that the rod engaging or touching portion of any such part shall be a plane or that any two such portions shall be parallel or at right-angles or at a slight distance apart in the direction of the rod. It is essential to my invention that such parts taken together shall control the relative movement of the bearing and the rod in every direction lateral to the rod, that each such portion shall be surrounded by a space in which the part does not touch the rod and that some such part shall have a rod-cleaning edge.

I claim:

1. In a textile machine, in combination, a rod and a bearing having movements in relation to each other, said bearing having parts provided with openings, the walls of said openings being adapted to control the relative movement of the rod and bearing in every lateral direction, said walls having rod-engaging portions provided with rod-clearing edges in angular relation to each other, and being shaped to form spaces on each side of said rod-engaging portions.

2. In a textile machine, in combination, a rod and a bearing having movements with relation to each other, said bearing having parts provided with openings the walls of which are adapted to control the relative lateral movement of the rod in directions in angular relation to each other, the walls of said openings being provided with rod-clearing edges and forming spaces on each side of said rod-clearing edges.

3. In a textile machine, in combination, a rod and a bearing having movements in relation to each other, said bearing having parts provided with openings, the walls of said openings being adapted to control the movement of said rod in every lateral direction, each of said walls having rod-engaging portions provided with rod-clearing edges and forming spaces on each side of said rod engaging portions, said parts being separated from each other in the direction of the length of the rod.

4. In a textile machine, a rod and bearings having movements in relation to each other, each bearing comprising two parts, each part having an opening the wall of which is provided with rod-engaging portions having rod-clearing edges, the rod-engaging portions of one part being in angular relation to the rod-engaging portions of the other part, and spaces located on either side of each rod-engaging portion.

5. In a textile machine, a rod and bearings having movements in relation to each other, each bearing comprising two parts, each part having rod-engaging portions with rod-clearing edges, the rod-engaging portions of one part being in angular relation to the rod-engaging portion of the other part, and also having a space on each side of each rod-engaging portion.

6. In a textile machine, in combination, a rod and a bearing having movements in relation to each other, said bearing having means to control the relative movement in every lateral direction, comprising rod-engaging portions with rod-clearing edges spaced at intervals circumferentially of the rod, and a space on each side of each rod-engaging portion.

In testimony whereof, I affix my signature in the presence of two witnesses.

CHARLES E. LOVEJOY.

Witnesses:
HARRIET B. WHITAKER,
CHANNING WHITAKER.